Figure 1:
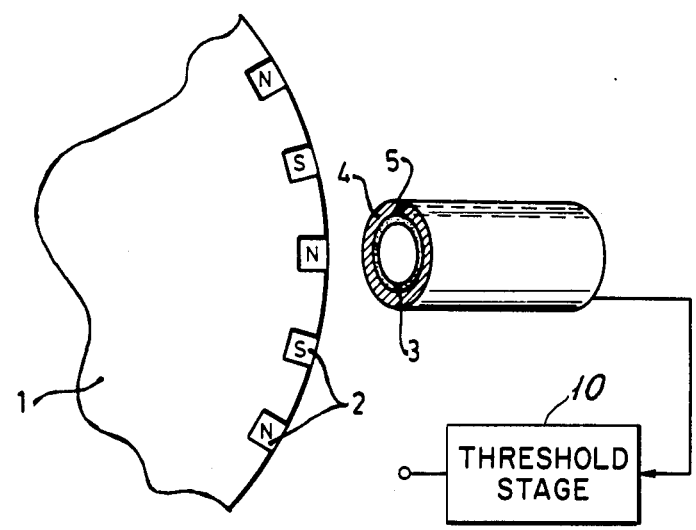

United States Patent [19]

Zabler et al.

[11] 4,150,314
[45] Apr. 17, 1979

[54] LEVEL AMPLITUDE OUTPUT ROTARY SPEED TRANSDUCER

[75] Inventors: Erich Zabler; Peter Hauler, both of Karlsruhe, Fed. Rep. of Germany

[73] Assignee: Robert Bosch GmbH, Stuttgart, Fed. Rep. of Germany

[21] Appl. No.: 855,212

[22] Filed: Nov. 28, 1977

[30] Foreign Application Priority Data

Dec. 3, 1976 [DE] Fed. Rep. of Germany ....... 2654755

[51] Int. Cl.² ............................................. H02K 21/38
[52] U.S. Cl. ..................... 310/155; 310/156; 310/168
[58] Field of Search ............ 148/103, 108, 120, 31.57; 123/146.5 A, 148 E; 310/168, 152, 156, 155, 111; 365/133

[56] References Cited

U.S. PATENT DOCUMENTS

| | | | |
|---|---|---|---|
| 3,279,959 | 10/1966 | Oshima et al. | 148/103 |
| 3,757,754 | 9/1973 | Wiegand | 123/146.5 A X |
| 3,780,313 | 12/1973 | Wiegand | 310/168 X |
| 3,818,465 | 6/1974 | Wiegand | 365/133 |
| 3,820,090 | 6/1974 | Wiegand | 148/120 X |
| 3,866,193 | 2/1975 | Wiegand | 365/133 |
| 3,892,118 | 7/1975 | Wiegand | 365/133 |
| 3,969,644 | 7/1976 | Nowak | 310/152 |

*Primary Examiner*—Donovan F. Duggan
*Attorney, Agent, or Firm*—Flynn & Frishauf

[57] ABSTRACT

A Wiegand wire forms part of a stator coil facing a rotor on which permanent magnets are located. The stator coil has two coil portions or coil sections which are wound or connected to provide opposing inductive outputs upon passage of the magnets in front of the coils to cancel each other, the Wiegand wire change of magnetization providing the additional read-out output, the amplitude of which will be independent of speed, but the recurrence rate will depend upon speed of the magnets passing the stator of transducer.

10 Claims, 5 Drawing Figures

LEVEL AMPLITUDE OUTPUT ROTARY SPEED TRANSDUCER

Literature reference to the Wiegand effect: "Electronics", July 10, 1975, pages 100 to 105.

The present invention relates to an inductive pulse transducer to provide a train of output pulses having a repetition rate representative of the rotary speed of a driven rotating element, and more particularly to a transducer in which the amplitude of the output pulses is independent of the speed of the rotating element, for use especially in vehicular applications as speed transducers of crankshafts of internal combustion engines, road wheels, transmission shaft speeds, and the like.

BACKGROUND AND PRIOR ART

It has previously been proposed to provide pulse transducers in which a rotor has permanent magnets located at the circumference thereof, in magnetically coupled relationship to a stator having at least one coil. Upon passage of the magnets, voltages are induced in the stator which are then transformed into pulses representative of passage of the magnets. Many such transducers are known and have been described, but all the inductive transducers provide outputs in which the amplitude level of the pulse derived therefrom changes with speed of passage of the magnets, that is, changes with the rotary speed of the element carrying the magnets. It has also been proposed to eliminate changes in amplitude output by using different types of transducers. Hall generators have been proposed, subjected to magnetic fields, as well as opto-electrical couplers. Hall generators have the disadvantage that the electrical signal is highly dependent on the magnetic field in which the Hall generator is placed; additionally, Hall generators are comparatively expensive elements. Opto-electrical couplers require careful encapsulation to prevent malfunction due to accumulated dirt.

THE INVENTION

It is an object to provide a transducer in which the output pulses have an amplitude which is independent on the speed of the element which is to be transduced, that is, is independent of the pulse repetition rate or frequency, and hence of the speed of passage of magnetic elements with respect to the stator thereof, and which provides, further, output pulses of essentially uniform amplitude even if the magnetic field is subjected to changes in field strength.

Briefly, a Wiegand wire is embedded in a coil to provide or induce an output in the coil upon change of magnetic state of the Wiegand wire. The coil itself is so wound or constructed that it has two coil sections or portions which provide inductive outputs due to passage of the magnets which are opposed to each other, so that the Wiegand wire will affect only one of the coils providing an output, whereas the inductive effects due to passage of the magnet past the coils will be cancelled or compensated due to their opposite sense of winding or inverted connection.

The Wiegand effect has been described in the literature - see the aforementioned literature reference. Briefly, upon change of a magnetic field to which a Wiegand wire is exposed, the Wiegand wire will change its polarization abruptly. This abrupt change in polarization will provide a needle or spike pulse in a coil surrounding the Wiegand wire. The voltage induced by passage of the rotor magnets in the coil surrounding the Wiegand wire, however, is compensated by the other coil or coil section, wound or connected to buck the voltage induced due to the passage of the rotor in the coil surrounding the Wiegand wire.

Various arrangements of physically locating the coil surrounding the Wiegand wire and the compensating coil are possible. In a preferred embodiment, two coils are located on the stator, one of which surrounding the Wiegand wire and the other compensating the induced voltage. Preferably, the output from the two coils in series connection is sensed in a threshold circuit.

Figure 2:
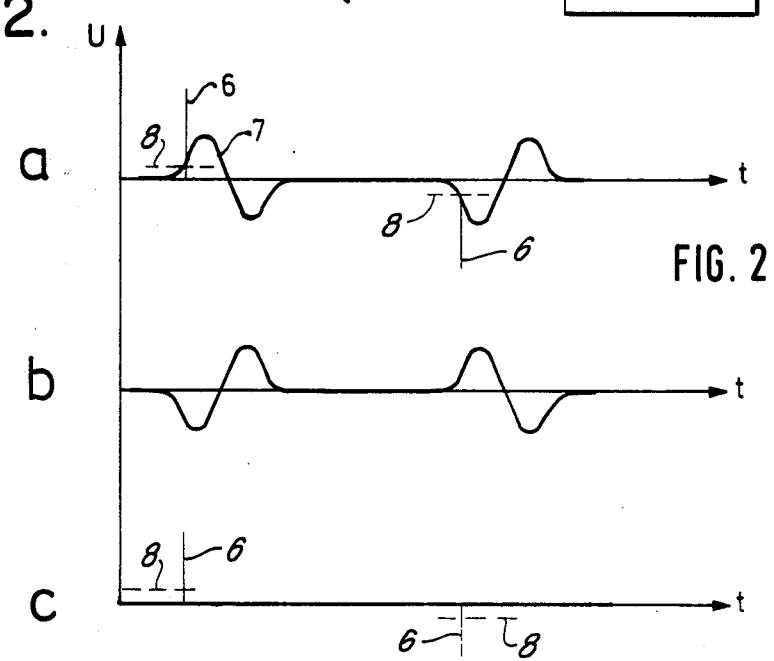
Figure 3:
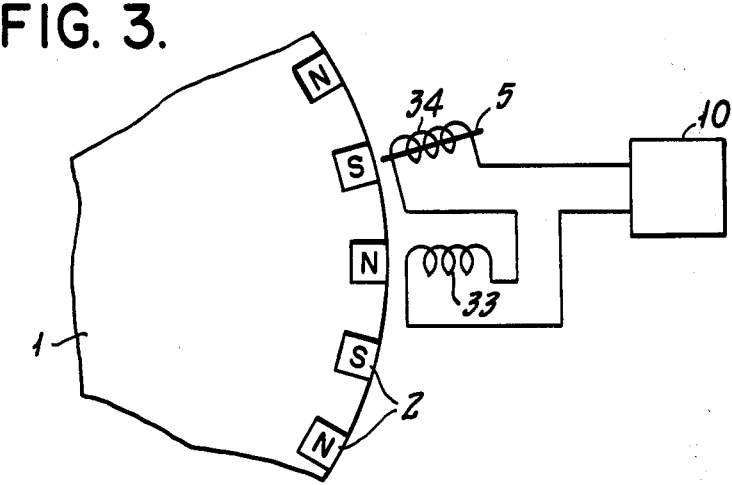
Figure 4:
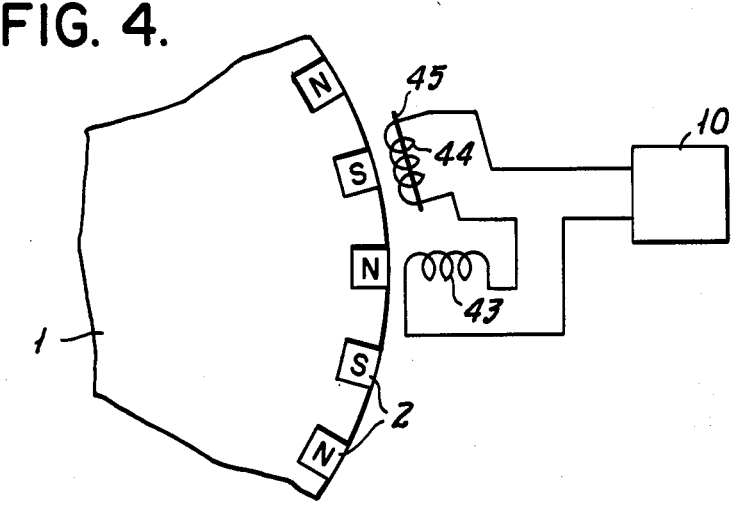
Figure 5:
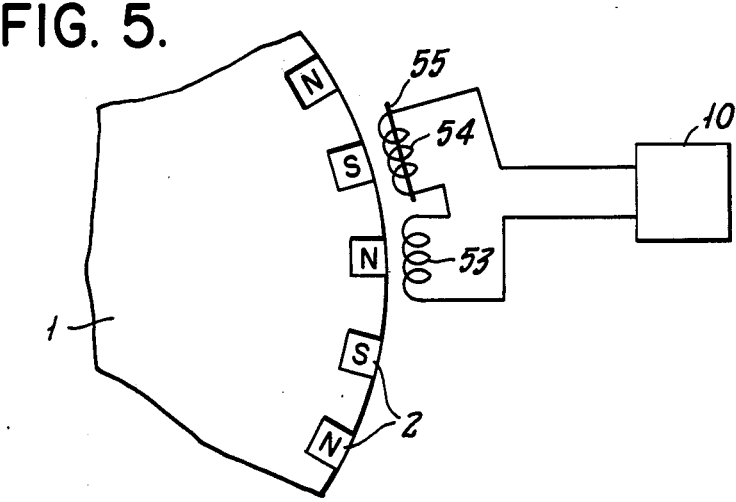

Drawings, illustrating an example:

FIG. 1, highly schematically, shows a pulse transducer;

FIG. 2 is a series of graphs illustrating induced voltages with respect to time; and FIGS. 3 to 5 illustrate modifications of the arrangement of the transducer coils, and are similar to FIG. 1.

FIG. 1: A rotor 1, of which only a portion is shown, has permanent magnets 2 located around the circumference thereof, with alternate polarity. The stator is secured to a frame of the structure (not shown) and has two coils 3, 4. The main sensing coil 4 surrounds a Wiegand wire 5. The Wiegand wire 5 is embedded in coil 4. Coil 3 is a compensation coil located within coil 4. It may be magnetically shielded with respect to coil 4 but this is not necessary. The outputs from coils 3, 4 are connected together, for example direct or through suitable buffers, not shown, in such a manner that their respective outputs due to change of the magnetic field upon rotation of rotor 1 will compensate or cancel each other. For example, the windings 3, 4 may be wound in opposite sense; or they may be inversely connected. Beside the direct coupling, suitable coupling, adding or subtracting circuit, which may be used between coils 3, 4 and threshold stage 10 are described in "National Linear Applications Handbook", January 1972, report AN31-1 OP Amp circuit collection.

Operation, with reference to FIG. 2: The Wiegand wire is an element in which the domains of a polycrystalline material are polarized in a certain direction by a magnetic field. After removal of the magnetic field, the magnetic domains remain in the so polarized state. Upon application of a magnetic field in reverse direction to the Wiegand wire, the direction of polarization will change suddenly and abruptly to the reverse as soon as the reversed magnetic field has a field strength in excess of a certain threshold level. The present invention is based on a utilization of this effect by generating a steep needle pulse in the receiving coil 4 surrounding the Wiegand wire 5. The needle pulse induced in coil 4 will have an amplitude which is solely dependent on the speed of reversal of the magnetic domains in the Wiegand wire. This pulse, which will be referred to as the Wiegand pulse, is utilized in the evaluation of the speed of passage of the rotor 1.

The coil 4 is additionally subjected to induced voltages due to change in flux upon passage of the magnets 2 in front of coil 4. These induced voltages are seen in FIG. 2a as voltage 7; the Wiegand pulse is shown as pulse 6. The two pulses will be superimposed in coil 4, as seen in graph *a* of FIG. 2. The compensation coil 3 will also have a voltage induced therein, shown in graph *b* of FIG. 2. Due to the reverse direction of winding of the compensation coil, or due to the inverse connection thereof, the voltage induced in coil 3 will be opposite to the voltage induced in coil 4, as can be cleary seen by comparison of graphs *a* and *b* of FIG. 2.

The Wiegand wire is located to be surrounded solely by coil 4. Thus, since the compensation coil 3 is not included within the change of magnetic field of the Wiegand wire, no Wiegand pulse will occur in coil 3 (see graph b, FIG. 2). Addition of the two voltages results in a pulse diagram as seen in graph c. A threshold stage 10 is preferably connected to the added output to suppress stray or noise pulses, and stray voltages of low amplitude. The threshold level is indicated by line 8 in graphs a and c of FIG. 2.

Compensation of the conventional inductive voltage due to change in flux in front of the coils 3, 4, and separation of the pure Wiegand pulse from the induced voltages and other stray or noise pulses permits high accuracy of the transduced signal with respect to a particular angular position of the rotor 1 even at low speed of the pulse transducer, that is, of the rotor 1 thereof.

Various changes and modifications may be made in the system, and the position of the coils is not at all critical. FIG. 3 illustrates an arrangement in which coil 34 surrounds Wiegand wire 5, and coil 33 is a separate coil facing a magnet of opposite polarity, so that the actual sensing coil 34 and the compensation coil 33 are exposed to different magnets. It is sometimes desirable to locate one of the coils tangentially and the other one radially, as shown, for example, in FIG. 4, in which the tangentially located coil 44 surrounds the Wiegand wire 45, and the radial coil 43 is the compensation coil. The arrangement could be reversed, with the Wiegand wire being placed in the radially arranged coil. Both coils can be placed tangentially, as shown in FIG. 5, the separation of the coils being determined by the angle between two magnets of different polarity; these need not be adjacent magnets.

The rotor itself may be a rotor structure with an interleaved pole shoe element, similar to a claw pole rotor, as well known in automotive-type alternator structure. Coils 33, 34; 43, 44; 53, 54 are so connected that the Wiegand pulse is separated, whereas the voltages induced by the passage of the magnets 2 in front of the coils are cancelled or suppressed. In FIGS. 3 to 5, also, buffers, additive or subtractive input circuits to the threshold stage 10 have been omitted since such circuits are well known and standard.

Other changes and modifications may be made, and features described in connection with any one of the embodiments may be used with any of the others, within the scope of the inventive concept.

We claim:

1. Pulse transducer to transduce a shaft speed into a series of electrical pulses, comprising
   a rotor (1) having a plurality of magnets (2) located thereon of alternate polarity;
   a stator including at least one coil (4)
   and comprising, in accordance with the invention, a Wiegand wire (5) surrounded by at least a portion of said coil (4), said coil having another portion not responsive to change of magnetic domain of the Wiegand wire upon passage of the magnets (2) of the rotor with respect thereto, said portions of the coil being so connected that the voltages induced in the coils due to passage of said magnets (2) of the rotor (1) oppose and essentially cancel each other.

2. Transducer according to claim 1, wherein the stator includes two coils (3, 4) forming said coil sections, one of said coils (4) surrounding said Wiegand wire (5).

3. Transducer according to claim 2, wherein (FIG. 1) said coils are coaxial with respect to each other.

4. Transducer according to claim 2, wherein (FIG. 3) each coil is located in a region facing a magnetic element of the rotor of different polarity.

5. Transducer according to claim 2, wherein (FIG. 4) one of said coils (44) is located tangentially with respect to the rotor, and the other of said coils (43) is located radially with respect to the rotor.

6. Transducer according to claim 2, wherein (FIGS. 1, 3) both coils (3, 4; 33, 34) are located radially with respect to the rotor (1).

7. Transducer according to claim 6, wherein (FIG. 1) both coils (3, 4) are coaxial with respect to each other.

8. Transducer according to claim 2, wherein (FIG. 5) both coils are located tangentially with respect to the rotor.

9. Transducer according to claim 1, further including a threshold stage (10) connected to the output of said transducer.

10. Transducer according to claim 1, wherein said coil sections (3, 4) are inductively essentially separated from each other.

* * * * *